United States Patent [19]
Fukui et al.

[11] Patent Number: 5,070,726
[45] Date of Patent: Dec. 10, 1991

[54] CYLINDER RECOGNITION APPARATUS FOR A MULTI-CYLINDER INTERNAL COMBUSTION ENGINE

[75] Inventors: Wataru Fukui; Toshio Iwata, both of Himeji, Japan

[73] Assignee: Mitsubishi Denki K.K., Tokyo, Japan

[21] Appl. No.: 591,180

[22] Filed: Oct. 1, 1990

[30] Foreign Application Priority Data

Oct. 2, 1989 [JP] Japan .................................. 1-255171

[51] Int. Cl.$^5$ .......................................... G01M 15/00
[52] U.S. Cl. .................................... 73/116; 250/231.18
[58] Field of Search ............... 307/515; 73/117.3, 116; 250/231.13, 231.18; 123/414; 340/686

[56] References Cited

U.S. PATENT DOCUMENTS

| | | | |
|---|---|---|---|
| 3,757,755 | 9/1973 | Carner | 123/414 |
| 4,467,763 | 8/1984 | Gillespie et al. | 123/414 |
| 4,988,865 | 1/1991 | Schmidt et al. | 250/231.18 |

FOREIGN PATENT DOCUMENTS

| | | | |
|---|---|---|---|
| 210367 | 2/1983 | Japan . | |
| 289417 | 11/1988 | Japan | 250/231.18 |

*Primary Examiner*—Jerry W. Myracle
*Attorney, Agent, or Firm*—Sughrue, Mion, Zinn, Macpeak & Seas

[57] ABSTRACT

An improved cylinder recognition apparatus for a multi-cylinder internal combustion engine capable of recognizing the operating states of a relatively large number of cylinders by use of two kinds of output signals of a signal generator in a short time and in a reliable manner. A signal generator generates a first signal and a second signal synchronously with the rotation of the engine, the first signal containing a plurality of positional pulses each representative of prescribed reference rotational positions of a corresponding cylinder, the second signal containing a plurality of cylinder recognition pulses each at a location near a corresponding one of the positional pulses. Each cylinder recognition pulse has a specific angular relation with respect to a corresponding positional pulse which is different from that of any other cylinder recognition pulse. A microcomputer detects the level of the second signal at the prescribed reference rotational positions of each cylinder so as to generate an appropriate serial pattern representative of a series of successively detected signal levels. The microcomputer includes a register for sequentially storing the successively detected signal levels, and has a look-up table stored therein which contains a plurality of serial patterns each corresponding to a specific cylinder. The microcomputer recognizes the operating state of each cylinder based on an appropriate number of successively detected last signal levels stored in the register while looking at the look-up table.

4 Claims, 4 Drawing Sheets

FIG. 4
| B5° n-2 | B75° n-1 | B5° n-1 | B75° n | REFERENCE POSITIONS / CYLINDERS |
|---|---|---|---|---|
| O | O | O | 1 | #1 |
| O | 1 | 1 | O | #3 |
| 1 | O | O | 1 | #4 |
| O | 1 | O | O | #2 |
FIG. 5
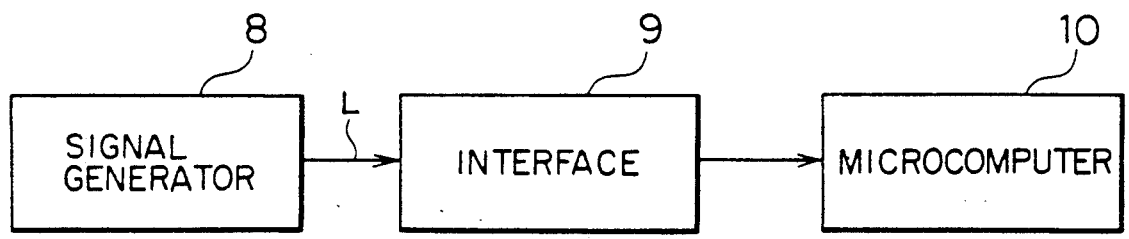
FIG. 6
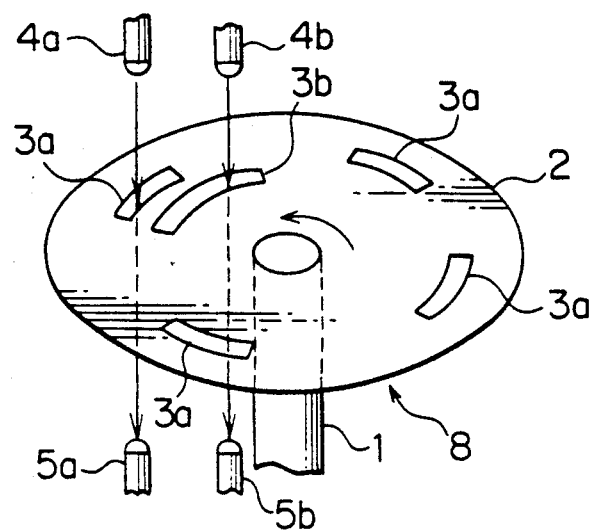

CYLINDER RECOGNITION APPARATUS FOR A MULTI-CYLINDER INTERNAL COMBUSTION ENGINE

BACKGROUND OF THE INVENTION

The present invention relates to a cylinder recognition apparatus for a multi-cylinder internal combustion engine which can recognize the operating condition or rotational position of each engine cylinder based on the output signals from a signal generator.

In order for a multi-cylinder internal combustion engine to properly operate, fuel injection, ignition and the like for each cylinder must take place at prescribed rotational positions or angles of the crankshaft of the engine, i.e., at the times when each piston of the engine is at prescribed positions with respect to top dead center. For this reason, an engine is equipped with a rotational position sensor such as a signal generator which senses the rotational angle or position of the crankshaft of the engine.

FIG. 5 illustrates, in a block diagram, a conventional cylinder recognition apparatus for a multi-cylinder internal combustion engine. The cylinder recognition apparatus includes a signal generator 8 which generates a positional signal L including a plurality of positional pulses corresponding to the respective cylinders of the engine, an interface circuit 9, and a microcomputer 10 which receives the positional signal L from the signal generator 8 through the interface circuit 9 and recognizes, based thereon, the operating condition (i.e., crank angle or rotational position) of each cylinder.

A typical example of such a signal generator 8 is illustrated in FIG. 6. In this figure, the signal generator 8 illustrated includes a rotating plate 2 mounted on a rotating shaft 1 (such as the distributor shaft) which rotates in synchrony with the crankshaft of the engine. The rotating plate 2 has a set of first slits 3a formed therethrough at prescribed locations. The slits 3a are disposed at equal intervals in the circumferential direction of the rotating plate 2. The slits 3a, which are equal in number to the cylinders, are disposed so as to correspond to prescribed rotational angles of the crankshaft and thus to prescribed positions of each piston with respect to top dead center for sensing when the crankshaft reaches a prescribed rotational position for each cylinder. Another or second slit 3b is formed in the rotating plate 2 adjacent one of the first slits 3a at a location radically inwardly thereof for sensing when the crankshaft rotational angle is such that the piston of a specific reference cylinder is in a prescribed position.

A first and a second light emitting diode 4a, 4b are disposed on one side of the rotating plate 2 on a first outer circle and a second inner circle, respectively, on which the outer slits 3a and the inner slits 3b are respectively disposed. A first and a second light sensor 5a, 5b each in the form of a photodiode are disposed on the other side of the rotating plate 2 in alignment with the first and the second light emitting diode 4a, 4b, respectively. The first light sensor 5a generates an output signal each time one of the outer slits 3a passes between the first light sensor 5a and the first light emitting diode 4a. Also, the second light sensor 5b generates an output signal each time the inner slit 3b passes between the second light sensor 5b and the second light emitting diode 4b. As shown in FIG. 7, the outputs of the first and second light sensors 5a, 5b are input to the input terminals of corresponding amplifiers 6a, 6b each of which has the output terminal coupled to the base of a corresponding output transistor 7a or 7b which has the open collector coupled to the interface circuit 9 (FIG. 5) and the emitter grounded.

Now, the operation of the above-described conventional cylinder recognition apparatus as illustrated in FIGS. 5 through 7 will be described in detail with particular reference to FIG. 8 which illustrates the waveforms of the output signals of the first and second light sensors 5a, 5b.

As the engine is operated to run, the rotating shaft 1 operatively connected with the crankshaft (not shown) is rotated together with the rotating plate 2 fixedly mounted thereon so that the first and second light sensors 5a, 5b of the signal generator B generate a first and a second signal $L_1$, $L_2$ each in the form of a square pulse. The first signal $L_1$ is a crank angle signal called SGT signal and has a rising edge corresponding to the leading edge of one of the outer slits 3a (i.e., a first prescribed crank angle or position of a corresponding piston) and a falling edge corresponding to the trailing edge thereof (i.e., a second prescribed crank angle of the corresponding piston). In the illustrated example, each square pulse of the SGT signal $L_1$ rises at the crank angle of 75 degrees before top dead center (a first reference position B75 degrees) of each piston, and falls at the crank angle of 5 degrees before top dead center (a second reference position B5 degrees).

The second signal $L_2$ is a cylinder recognition signal called SGC signal, and has a rising edge corresponding to the leading edge of the inner slit 3b and a falling edge corresponding to the trailing edge thereof. The SGC signal $L_2$ is issued substantially simultaneously with the issuance of an SGT signal pulse corresponding to the specific reference cylinder #1 so as to identify the same. To this end, the inner slit 3b is designed such that it has a leading edge which corresponds to a crank angle before the first reference angle of the corresponding SGT signal pulse (i.e., a crank angle greater than 75 degrees before TDC), and a trailing edge corresponding to a crank angle after the second reference angle of the corresponding SGT signal pulse (i.e., a crank angle smaller than 5 degrees before TDC). Thus, actually, the rising edge of an SGC signal pulse occurs before that of a corresponding SGT signal pulse, and the falling edge of the SGC signal pulse occurs after that of the corresponding SGT signal pulse.

The two kinds of first and second signals $L_1$, $L_2$ thus obtained are input via the interface circuit 9 to the microcomputer 10 which recognizes the specific reference cylinder #1 based on the second signal $L_2$, and the operational positions (i.e., crank angles or rotational positions) of the remaining cylinders #2 through #4 based on the first signal $L_1$, whereby various engine operations such as ignition timings, fuel injection timings, etc., are properly controlled.

With the conventional cylinder recognition apparatus for a multi-cylinder internal combustion engine as described above, however, the signal generator 8 generates only a single cylinder recognition signal pulse corresponding to one specific cylinder alone. As a result, cylinder recognition takes a relatively long time, i.e., requires two revolutions (i.e., 720 degrees) of the crank shaft, and it will substantially become difficult or infeasible to perform cylinder recognition with the use of a single signal generator if the number of cylinders to be recognized increases. To cope with such a situation, it becomes necessary to increase the number of signal generators as well as the load of the hardware or microcomputer to be employed, with the result that the overall construction of the cylinder recognition apparatus becomes complicated, thus increasing the manufacturing cost thereof.

SUMMARY OF THE INVENTION

Accordingly, the present invention is intended to obviate the above-described problem of the conventional cylinder recognition apparatus.

An object of the present invention is to provide an improved cylinder recognition apparatus for a multi-cylinder internal combustion engine which is able to recognize the operating states of a relatively large number of cylinders by use of two kinds of output signals of a signal generator in a short time and in a reliable manner.

Another object of the present invention is to provide an improved cylinder recognition apparatus for a multi-cylinder internal combustion engine which is simple in construction and which is able to be manufactured at low costs.

A further object of the present invention is to provide an improved signal generator suitable for use with a cylinder recognition apparatus which is simple in construction and which generates two kinds of output signals including a plurality of first pulses each representative of prescribed rotational positions of a corresponding cylinder, and a plurality of second pulses for recognition of the cylinders.

In order to achieve the above objects, according to one aspect of the present invention, there is provided a cylinder recognition apparatus for a multi-cylinder internal combustion engine comprising:

a signal generator for generating a first signal and a second signal synchronously with the rotation of the engine, the first signal containing a plurality of positional pulses each representative of prescribed reference rotational positions of a corresponding cylinder, the second signal containing a plurality of cylinder recognition pulses each at a location near a corresponding one of the positional pulses, each cylinder recognition pulse having a specific angular relation with respect to a corresponding positional pulse which is different from that of any other cylinder recognition pulse; and cylinder recognition means for detecting the level of the second signal at the prescribed reference rotational positions of each cylinder so as to generate an appropriate serial pattern representative of a series of successively detected signal levels, the cylinder recognition means being operable to recognize the operating state of each cylinder based on the serial pattern.

Preferably, the cylinder recognition means includes a register for sequentially storing the successively detected signal levels, and has a look-up table stored therein which contains a plurality of serial patterns each corresponding to a specific cylinder. The cylinder recognition means operates to perform cylinder recognition based on an appropriate number of successively detected last signal levels stored in the register while looking at the look-up table.

According to another aspect of the present invention, there is provided a signal generator for use with a cylinder recognition apparatus comprising:
 a rotating shaft;
 a rotating plate fixedly mounted on the rotating shaft and having a plurality of first slits and a plurality of second slits formed therethrough, the first slits being disposed on a first circle around the axis of the rotating shaft at substantially equal circumferential intervals and having substantially the same circumferential length, each of the second slits being disposed on a second circle concentric with the first circle at a locations near a corresponding one of the first slits each of the second slits being disposed in such a manner as to have a specific angular relation with respect to a corresponding first slit which is different from that of any one of the other second slits;
 a first photocoupler disposed near the rotating plate substantially on the first circle for generating an output position signal when it senses that one of the first slits in the rotating plate traverses a first prescribed location during the rotation of the rotating plate; and
 a second photocoupler disposed near the rotating plate substantially on the second circle for generating an output recognition signal when it senses that one of the second slits in the rotating plate traverses a second prescribed location during the rotation of the rotating plate.

Each of the first and second slits has a leading edge and a trailing edge with respect to the rotating direction of the rotating shaft, and the angular distance between the leading or trailing edge of each second slit and the leading or trailing edge of its corresponding first slit is different from that between the leading or trailing edge of any one of the other second slits and the leading or trailing edge of its corresponding first slit.

The above and other objects, features and advantages of the present invention will become more readily apparent from the ensuing detailed description of a preferred embodiment of the invention taken in conjunction with the accompanying drawings.

BRIEF DESCRIPTION OF THE DRAWINGS

FIG. 4 is a view showing an example of a table for use with the cylinder recognition performed by the cylinder recognition apparatus;

FIG. 5 is a schematic block diagram of a conventional cylinder recognition apparatus for a multi-cylinder internal combustion engine;

FIG. 6 is a perspective view illustrating the general arrangement of a conventional signal generator employed with the conventional cylinder recognition apparatus of FIG. 5;

DESCRIPTION OF THE PREFERRED EMBODIMENT

Figure 1:
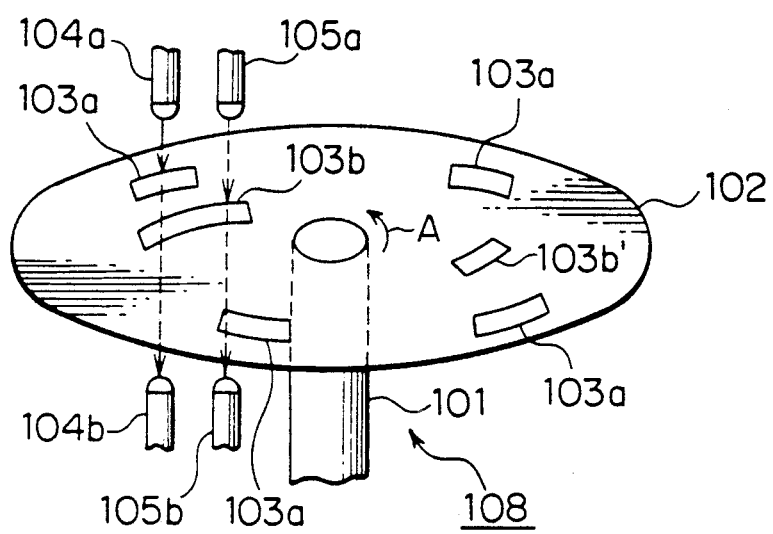
FIG. 1 is a perspective view schematically illustrating the arrangement of a signal generator for use with the present invention.

The present invention will now be described in detail with reference to a preferred embodiment as illustrated in the accompanying drawings.

First, it should be understood that the general arrangement of a cylinder recognition apparatus for a multi-cylinder internal combustion is similar to that of the conventional one illustrated in FIG. 5. However, a signal generator, which is generally designated by reference numeral 108 in FIG. 1, is different in construction and operation from the conventional one as illustrated in FIG. 6.

More specifically, as shown in FIG. 1, the signal generator 108 of the present invention includes a rotating shaft 101 operatively connected with the crankshaft (not shown) of a multi-cylinder internal combustion engine, and a rotating plate 102 fixedly mounted on the rotating shaft 101, as in the conventional signal generator 8 of FIG. 5. The rotating plate 102 has a plurality of first slits 103a formed therein at locations circumferentially spaced from each other at equal intervals, each of the slits 103a relating to a corresponding cylinder of the engine. The first slits 103a are disposed on a circle around the axis of the rotating shaft 101 and have substantially the same circumferential length. A plurality of (two in the illustrated embodiment) second slits 103b, 103b' are formed in the rotating plate 102 at locations near specific ones (e.g., corresponding to a first and a second specific reference cylinder #1 and #4 in the illustrated embodiment) of the first slits 103a. The second slits 103b, 103b' are disposed on a circle which is concentric with the circle on which the first slits 103a are disposed. In the illustrated example, the second slits 103b, 103b' are disposed radially inside the first slits 103a, but they may be disposed radially outside the first slits 103a. The second slits 103b, 103b' are different in phase (i.e., in angular relation) from each other with respect to their corresponding first slits 103a. In the illustrated example, the second slit 103b has a leading edge disposed angularly forward of the leading edge of the corresponding first slit 103a and a trailing edge disposed angularly rearward of the trailing edge thereof in the rotating direction of the rotary shaft 101, whereas the second slit 103b' has a leading edge and a trailing edge disposed angularly forward of the leading edge and the trailing edge, respectively, of the corresponding first slit 103a.

A first photocoupler 104 is provided near the rotating plate 102 for generating an output signal when it senses that one of the first slits 103a in the rotating plate 102 passes a prescribed location during the rotation of the rotating plate 102. Similarly, a second photocoupler 105 is provided near the rotating plate 102 for generating an output signal when it senses that one of the second slits 103b, 103b' in the rotating plate 102 passes a prescribed location during the rotation of the rotating plate 102. Each of the first and second photocouplers 104, 105 includes a pair of a light emitting diode 104a or 105a and a light sensor 104b or 105b in the form of a photodiode which are disposed on the opposite sides of the rotating plate 102 in alignment with each other on a circle on which the first or second slits 103a or 103b, 103b' are disposed. Each of the light sensors 104b, 105b generates an output signal in the form of a square pulse each time it receives light which was emitted from the light emitting diode 104a or 105a and which passed through the first slits 103a or the second slits 103b, 103b', i.e., at the time when one of the slits 103a or 103b, 103b' traverses between the light emitting diode 104a or 105a and the light sensor 104a or 105b.

Figure 2:
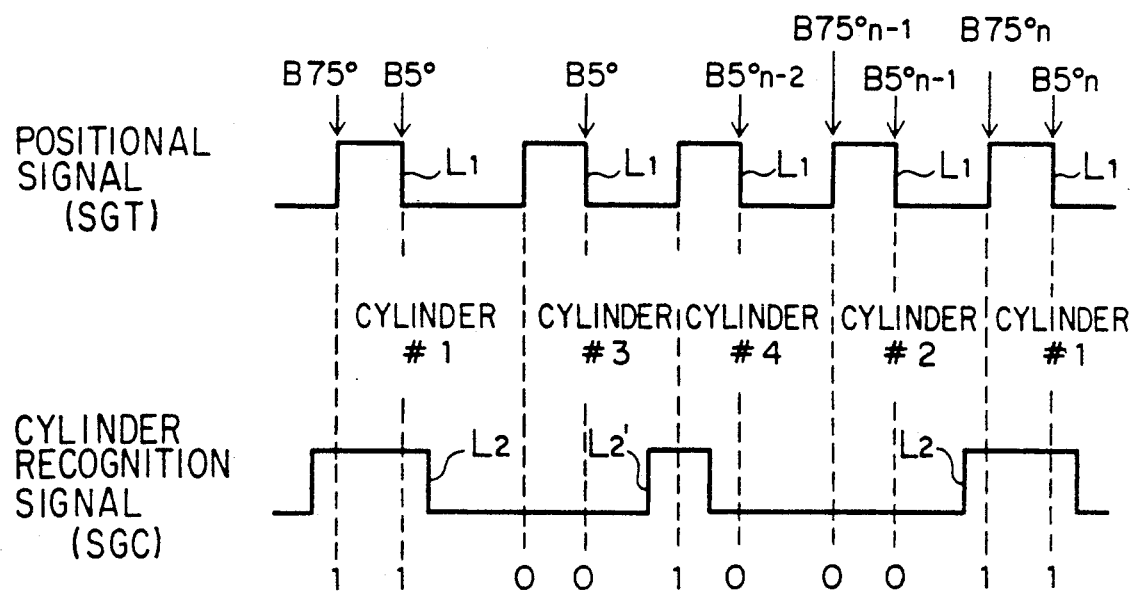
FIG. 2 is a waveform diagram of a crank angle signal (SGT) and a cylinder recognition signal (SGC) of the signal generator of FIG. 1.
Figure 8:
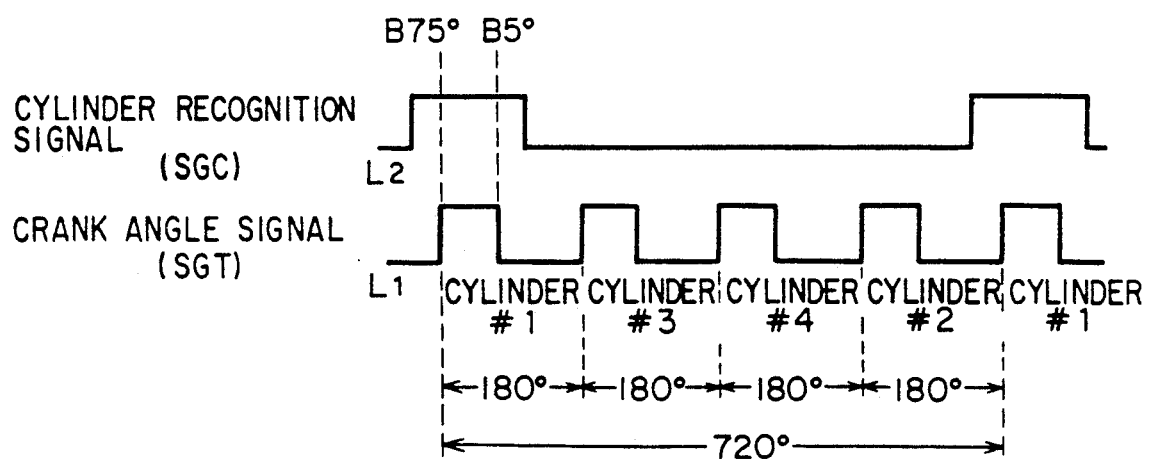
FIG. 8 is a waveform diagram of a crank angle signal $L_1$ and a cylinder recognition signal $L_2$.

Thus, as illustrated in FIG. 2, the output signal (SGT) of the light sensor 104b contains a plurality of first or positional pulses $L_1$ each corresponding to a first slit 103a, as in the output signal of the light sensor 5b of the conventional signal generator 8 illustrated in FIG. 8. Each of the positional pulses $L_1$ has a rising edge, which occurs at the leading edge of one of the first slits 103a (e.g., at the crank angle of 75 degrees before top dead center), and a falling edge, which occurs at the trailing edge thereof (e.g., at the crank angle of 5 degrees before top dead center).

On the other hand, the output signal (SGC) of the light sensor 105b contains a plurality of (two in the illustrated example) second or cylinder recognition pulses $L_2$, $L'_2$ corresponding to the second slits 103b, 103b', respectively. The cylinder recognition pulse $L_2$ has a rising edge, which occurs at the leading edge of the corresponding second slit 103b (e.g., at a certain crank angle which is in advance of the angle of 75 degrees before top dead center), and a falling edge, which occurs at the trailing edge thereof (e.g., at a certain crank angle which is after the angle of 5 degrees before top dead center). Likewise, the cylinder recognition pulse $L'_2$ has a rising edge, which occurs at the leading edge of the corresponding second slit 103b' (e.g., at a certain crank angle which is in advance of the angle of 75 degrees before top dead center), and a falling edge, which occurs at the trailing edge thereof (e.g., at a certain crank angle which is between the angle of 75 degrees before top dead center and the angle of 5 degrees before top dead center).

Figure 7:
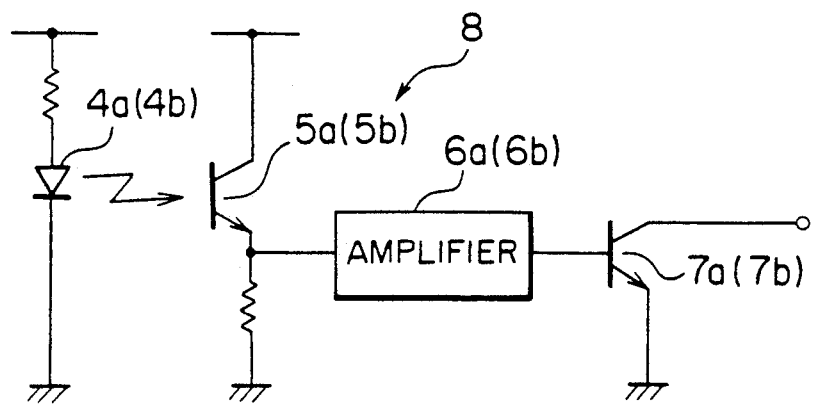
FIG. 7 is a schematic circuit diagram of the conventional signal generator of FIG. 6.

The output signal of the signal generator 108 is amplified by an unillustrated amplifier and then fed to the base of an unillustrated output transistor which has the collector coupled to an interface circuit of a cylinder recognition means in the form of a microcomputer and the emitter grounded, as in the conventional cylinder recognition apparatus illustrated in FIG. 7.

The construction and operation of this embodiment other than the above are substantially similar to those of the conventional cylinder recognition apparatus as illustrated in FIGS. 5 through 8.

Figure 3:
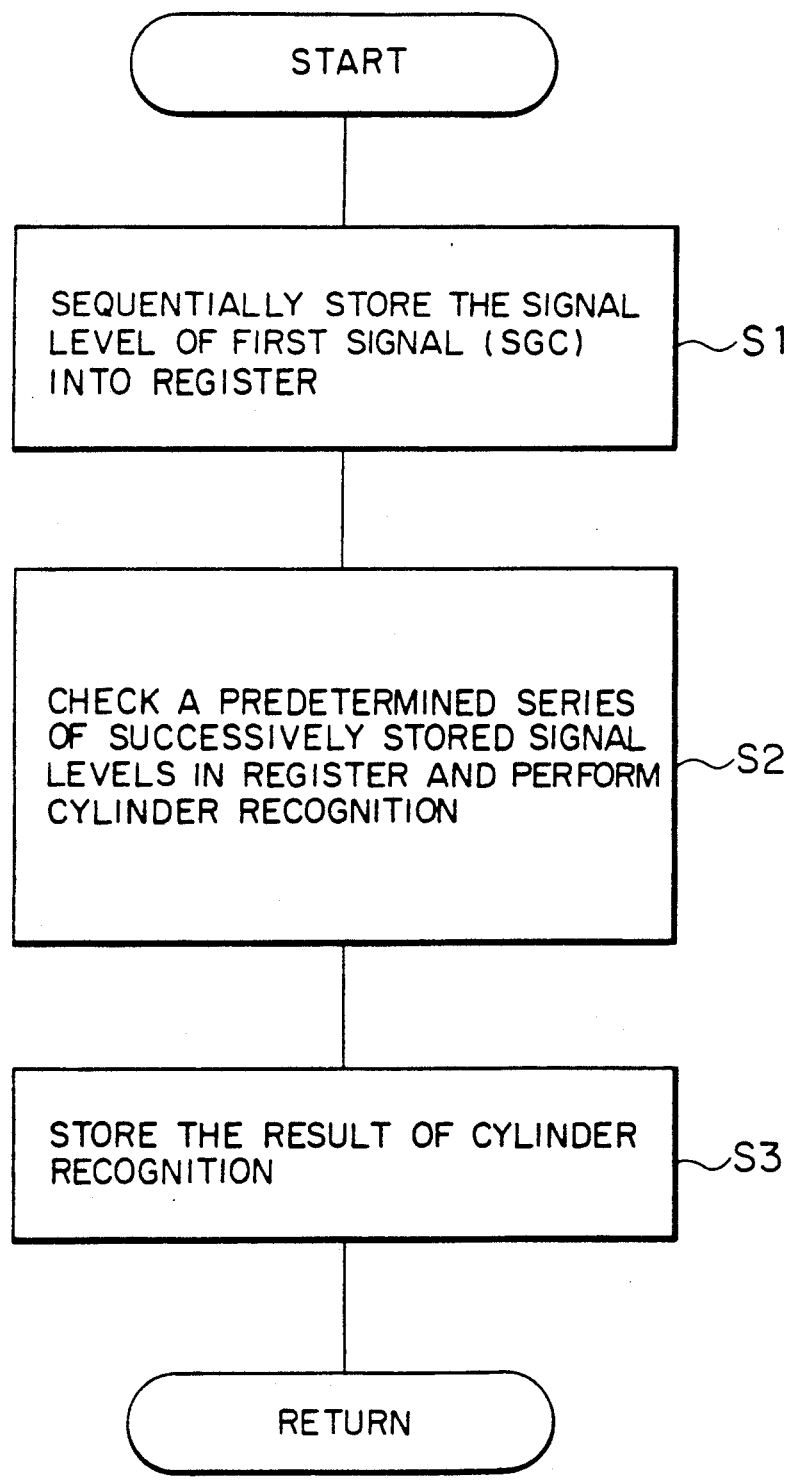
FIG. 3 is a flow chart illustrating the operation of a cylinder recognition apparatus for a multi-cylinder internal combustion engine equipped with the signal generator of FIG. 1 according to the present invention.

Next, the operation of this embodiment will be described in detail with particular reference to the flow chart of FIG. 3.

When the engine is started to operate, the rotating plate 102 rotates in a direction indirected by arrow A in FIG. 1 in synchrony with the rotation of the engine, and the light sensor 104b of the signal generator 108 generate a first or positional output signal (SGT) containing a plurality of first pulses $L_1$, and the light sensor 105b generates a second or cylinder recognition signal (SGC) containing a plurality of second pulses $L_2$, $L'_2$, as shown in FIG. 2. The microcomputer (not shown) receives via the unillustrated interface circuit the output signals (SGT), (SGC) of the signal generator 108, and processes them in a manner as shown in the flow chart of FIG. 3 in accordance with a control program stored therein.

Specifically, at first in Step S1, the microcomputer sequentially detects and stores the signal level (i.e., high level "1" or low-level "0") of the second signal (SGC) in a register (not shown) incorporated therein at the prescribed reference rotational positions of each cylinder, i.e., each time the rising edge or falling edge of a positional signal pulse $L_1$ takes place (e.g., at the crank angle of 75 degrees before top dead center and 5 degrees before top dead center in the illustrated example). For example, "1" and "0" are stored in the register when the cylinder recognition signal (SGT) is at the high level and at the low level, respectively, upon each occurrence of the rising or falling edge of a positional signal pulse $L_1$.

Subsequently in Step S2, a predetermined series of successively stored contents or signal levels in the register is checked so as to determine or identify to which cylinder the present pulse of the positional signal (SGT) corresponds. To this end, the microcomputer has a look-up table for use with cylinder identification stored therein in advance, as shown in FIG. 4. For example, the microcomputer reads out the contents of the register stored at the last four successive reference rotational positions (i.e., the last four successive rising and falling edges) of the positional signal (SGT) (i.e., at the last four angles of 75 and 5 degrees before top dead center), as designated by $B75°_n$, $B5°_{n-1}$, $B75°_{n-1}$ and $B5°_{n-2}$ in FIG. 2, and then determines, while looking at the table of FIG. 4, to which cylinder the present pulse $L_1$ of the positional signal (SGT) corresponds. Namely, if the contents thus read out are "0001", it is determined that the present positional signal pulse corresponds to cylinder #1. Similarly, the contents of "0110", "1001" and "0100" are determined to correspond to cylinders #3, #4" and #2, respectively. Once one of the cylinders #1 through #4 is thus identified, it is automatically determined to which cylinders the succeeding positional signal pulses $L_1$ correspond since the operational order of the cylinders is predetermined.

In this connection, it is to be noted that the time required to perform such determination is equal to a period of time in which the rotating plate 102 makes a half revolution irrespective of the initial condition of the rotating plate 102 at the time of engine cranking. Accordingly, the cylinder recognition apparatus of the present invention is able to complete cylinder recognition in a very short time as compared with the aforementioned conventional one which requires a time corresponding to one revolution of the rotating plate 2 at a maximum.

After Step S2, the program goes to Step S3 where the microcomputer stores the result of the cylinder recognition, and then in Step S4, a return is performed.

After cylinder recognition has been completed, various engine operations such as ignition, fuel injection, etc., can be properly controlled based on the positional signal (SGT), e.g., based on the rising edge and/or falling edge of each positional pulse $L_1$. For example, ignition can be controlled such that the current supply to the ignition coil of the engine is cut off at the falling edge of each positional pulse $L_1$ so as to properly control the ignition timing of a corresponding cylinder.

As apparatus from the foregoing, in the present invention, the rotating plate 102 is merely provided with the additional second slit 103b' for generating a cylinder recognition signal pulse $L'_2$ in addition to the ordinary or conventional slits 103a and 103b, and the microcomputer is provided with a register and a look-up table for cylinder recognition in addition to the conventional elements required with the aforementioned conventional cylinder recognition apparatus. Accordingly, the hardware of the apparatus of the invention is not subject to any heavier load than that imposed on the hardware of the conventional apparatus. In addition, it is possible to perform cylinder recognition by employing a very simple algorism or program.

Further, increasing the number of additional second slits 103b' as required makes it possible for the apparatus to perform cylinder recognition in a much shorter time, so the cylinder recognition apparatus of the invention is particularly advantageous and feasible when applied to a multi-cylinder internal combustion engine having a relatively large number of cylinders. In this case, each of additional second slits have to be located near its corresponding first slit and different in angular phase from all the other second slits. In other words, the angular distance between a leading or trailing edge of each additional second slit and a leading or trailing edge of its corresponding first slit has to be different from that between a leading or trailing edge of any one of the other second slits and a leading or trailing edge of its corresponding first slit in such a manner that each cylinder recognition pulse has a specific combination of high and low levels at the rising and falling edges of a corresponding positional signal pulse, which is different from that of any other cylinder recognition pulse, so as to enable cylinder recognition.

What is claimed is:

1. A cylinder recognition apparatus for a multi-cylinder internal combustion engine comprising:
    a signal generator for generating a first signal and a second signal synchronously with the rotation of the engine, the first signal containing a plurality of positional pulses each representative of prescribed reference rotational positions of a corresponding cylinder, the second signal containing a plurality of cylinder recognition pulses each at a location near a corresponding one of the positional pulses, each cylinder recognition pulse having a specific angular relation with respect to a corresponding positional pulse which is different from that of any other cylinder recognition pulse; and
    cylinder recognition means for detecting the level of the second signal at the prescribed reference rotational positions of each cylinder so as to generate an appropriate serial pattern representative of a series of successively detected signal levels, the cylinder recognition means being operable to recognize the operating state of each cylinder based on the serial pattern.

2. A cylinder recognition apparatus as claimed in claim 1, wherein the cylinder recognition means includes a register for sequentially storing the successively detected signal levels, and has a look-up table stored therein which contains a plurality of serial patterns each corresponding to a specific cylinder, the cylinder recognition means being operable to perform cylinder recognition based on an appropriate number of successively detected last signal levels stored in the register while looking at the look-up table.

3. A signal generator for use with a cylinder recognition apparatus comprising:
    a rotating shaft;
    a rotating plate fixedly mounted on the rotating shaft and having a plurality of first slits and a plurality of second slits formed therethrough, the first slits being disposed on a first circle around the axis of the rotating shaft at substantially equal circumferential intervals and having substantially the same circumferential length, each of the second slits being disposed on a second circle concentric with the first circle at a locations near a corresponding one of the first slits, each of the second slits being disposed in such a manner as to have a specific angular relation with respect to a corresponding first slit which is different from that of any one of the other second slits;

a first photocoupler disposed near the rotating plate substantially on the first circle for generating an output position signal when it senses that one of the first slits in the rotating plate traverses a first prescribed location during the rotation of the rotating plate; and a second photocoupler disposed near the rotating plate substantially on the second circle for generating an output recognition signal when it senses that one of the second slits in the rotating plate traverses a second prescribed location during the rotation of the rotating plate.

4. A signal generator as claimed in claim 3, wherein each of the first and second slits has a leading edge and a trailing edge with respect to the rotating direction of the rotating shaft, the angular distance between the leading or trailing edge of each second slit and the leading or trailing edge of its corresponding first slit being different from that between the leading or trailing edge of any one of the other second slits and the leading or trailing edge of its corresponding first slit.

* * * * *